United States Patent [19]

Escoe

[11] 3,783,513
[45] Jan. 8, 1974

[54] CARPET CUTTER
[76] Inventor: James L. Escoe, Route No. 2, Loganville, Ga. 30249
[22] Filed: Mar. 21, 1972
[21] Appl. No.: 236,673

[52] U.S. Cl. .................................... 30/273, 30/276
[51] Int. Cl. ............................................ B26b 25/00
[58] Field of Search .................... 30/233, 264, 276, 30/293, 286, 374, 375, 390, 240, 273, 275

[56] References Cited
UNITED STATES PATENTS
| | | | |
|---|---|---|---|
| 2,930,123 | 3/1960 | Clark | 30/276 |
| 3,148,448 | 9/1964 | Gragg | 30/276 |
| 1,338,478 | 4/1920 | Zawistowski | 30/264 X |
| 2,666,986 | 1/1954 | Codianne | 30/293 |
| 3,111,969 | 11/1963 | Bivens | 30/276 |

Primary Examiner—Donald G. Kelly
Assistant Examiner—J. C. Peters
Attorney—Edward Taylor Newton et al.

[57] ABSTRACT

Apparatus for use in cutting carpet including a frame support means having a power driven motor for supporting a rotary cutting disc. The cutting apparatus includes a skid plate mounted beneath the rotary cutting disc and attached to the frame support means by adjustable support means whereby the skid plate can be secured in a plurality of vertically adjusted positions relative to the rotary cutting disc. The cutting apparatus includes a pair of diametrically opposed backing plates supported by adjustable link means and detailed in location to include a shaped surface for cooperating with the rotary cutting disc to provide a backing means for carpet being cut. A sharpening element is adjustably mounted on the frame support means for movement from a displaced inoperable position to an adjusted position for sharpening the rotary cutting disc.

6 Claims, 5 Drawing Figures

PATENTED JAN 8 1974

CARPET CUTTER

BACKGROUND OF THE INVENTION

This invention relates to a portable power driven cutting apparatus and is more particularly concerned with a cutting apparatus detailed for trimming or cutting carpet along the lateral edges adjacent upright wall means.

The most common cutting apparatus utilized in trimming carpet edges immediately prior to securing them in place on a supporting surface includes a portable frame element having a number of fixed cutting blades and including guide means for guiding the cutting element along the base of an upright wall. A cutting operation is performed by engaging the carpet with the fixed cutting blades and manually moving the cutting device through the carpet to trim the edges in a cutting operation. One problem with this type of prior art cutting apparatus is that it requires manual power to effect movement of the cutting element and in certain types of carpets, the carpet nap and/or backing will become entangled with the cutting device. Another problem with the prior art cutting apparatus is that the fixed cutting blades quickly become dull and must be removed for sharpening.

Another prior art carpet cutting device is disclosed in a patent to Greenberg, U.S. Pat. No. 3,562,907. The Greenberg carpet cutting device includes a portable power driven cutting element which is rotatable about a horizontal axis and includes guide means operatively associated therewith for guiding carpet during a cutting operation. One problem with the Greenberg cutting device is that the cutting device must be initiated adjacent one edge of the carpet and the guide apparatus is advanced beneath the carpet. The guide apparatus will contact obstructions or upstanding prongs provided on the supporting surface for engaging and retaining the carpet in place to interfere with a cutting operation. Another problem with the Greenberg carpet cutting device is that it is difficult to cut carpet sufficiently close to the base of a supporting surface and an upright wall whereby the cut carpet will be sufficiently long to engage and be secured in place adjacent the base of the wall.

SUMMARY OF THE INVENTION

The above disadvantages have been overcome by the present invention which basically includes a portable power driven cutting tool having a cutting disc rotatable in a horizontal plane and including a skid plate adjustably supported therebeneath to vary the distance between the skid plate and the cutting disc. The cutting disc includes a pair of diametrically opposed backing plates operatively associated with the cutting disc and are selectively adjustable between extended inoperable positions and retracted operable positions.

An important feature of the present invention is that a selectively adjustable sharpening tool is supported on the cutting apparatus and movable from a retracted inoperable position to an adjusted operable position for effecting a sharpening of the cutting disc.

It is therefore a primary object of the present invention to provide a power driven cutting tool operable for trimming carpet adjacent the lateral edges and in close proximity to the base of an upright wall and the supporting floor surface.

An additional object of the present invention is to provide a carpet cutting tool which is simple in construction and operation, economical to manufacture and reliable in performance.

These and other objects and advantages of the details of construction will become apparent after reading the following description of the illustrative embodiment, with reference to the attached drawings wherein like reference numerals have been used to refer to like parts throughout the several figures and wherein:

BRIEF DESCRIPTION OF THE FIGURES OF DRAWING

DESCRIPTION OF THE ILLUSTRATIVE EMBODIMENT

Figure 1:
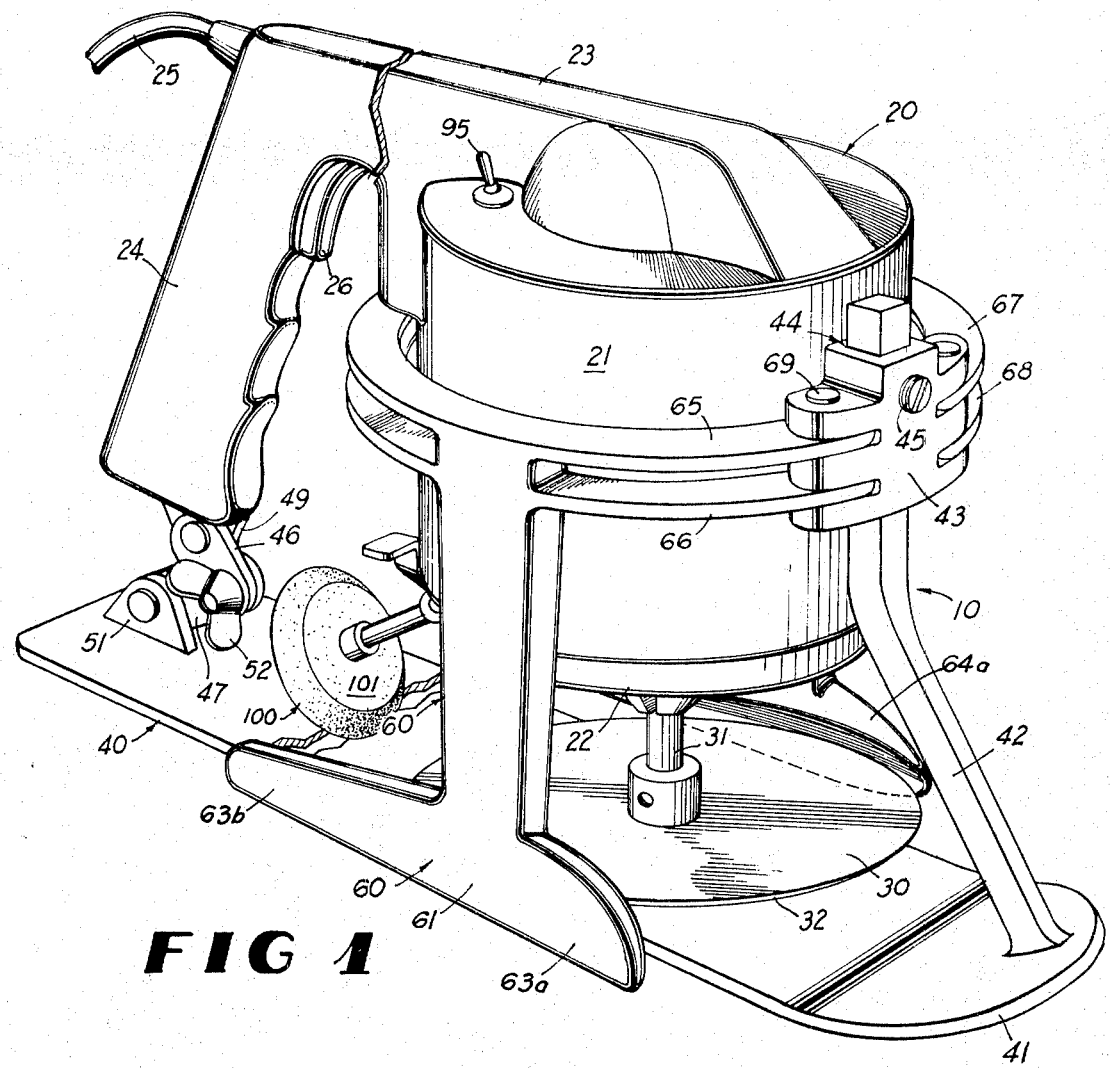
FIG. 1 is a perspective view of a carpet cutting apparatus embodying the principles of the present invention.

Referring now to the drawings, the carpet cutting apparatus embodying the principles of the present invention is shown and generally represented by the reference numeral 10. The carpet cutting apparatus 10 will be described with reference to a motor and frame support means 20, a skid plate 40, carpet backing means 60 and cutting disc sharpening apparatus 100.

As shown in FIGS. 1-3 and 5, the motor and frame support means 20 includes a motor housing structure 21 detailed to support a conventional electric motor drive means having a chuck assembly 22. Motor 21 includes a horizontally projecting housing structure 23 having a downwardly angled handle grasping portion 24. Power is supplied to the electric motor through a supply line 25 and is controlled in an "on" and "off" operation by a conventional trigger operable switch means 26.

Figure 2:
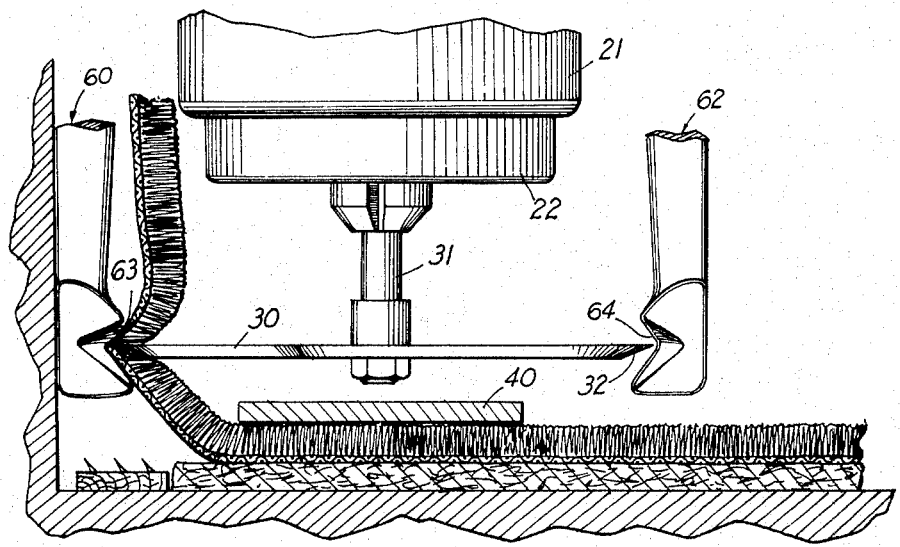
FIG. 2 is a fragmentary front elevational view showing the carpet cutting apparatus of FIG. 1 utilized in cutting carpet adjacent the base of a vertical wall and a floor supporting structure, with certain parts broken away and shown in section and certain parts omitted for purpose of clarity.
Figure 3:
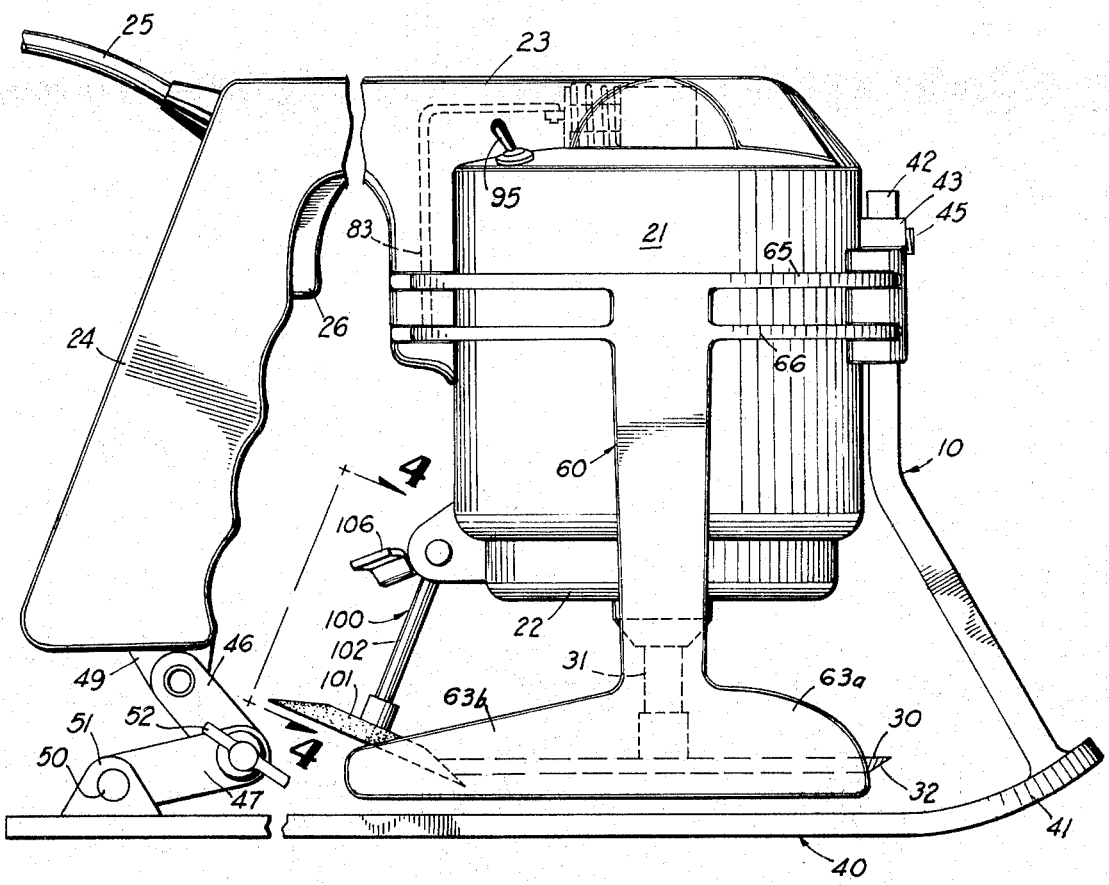
FIG. 3 is a side elevational view of the carpet cutting apparatus shown in FIG. 1.

As shown in FIGS. 2 and 3, the carpet cutting apparatus 10 includes a rotary cutting disc 30 having a support shaft 31. Shaft 31 is secured in a locked position within the chuck assembly 22 whereby power developed by motor 21 will effect rotary movement of cutting disc 30. The cutting disc 30 is provided with a beveled or sharpened cutting edge 32.

As shown in FIGS. 1-3, the carpet cutting apparatus includes a skid plate 40 having an upwardly curved front end 41. Attached to the front end of skid plate 40 is an upstanding standard 42. Standard 42 is slidably received within a housing element 43 integrally formed with motor housing 21. Housing element 43 includes an opening 44 complementary to the shape of standard 42. Standard 42 is vertically slidable within opening 44 and is adapted to be secured in an adjusted position by means of a conventional locking screw means 45. As shown in FIGS. 1 and 3, the rear edge of skid plate 40 is secured to the handle means 24 by a pair of adjustable link members 46, 47. Link 46 is pivotally attached at 48 to a downwardly projecting bracket 49 formed integrally with handle 24. Link 47 is pivotally connected at 50 to an upstanding bracket member 51 provided adjacent a rear edge of the skid plate 40. Links 46, 47 are secured in an angularly set position relative to each other by a wing-nut locking screw means 52. In adjusting the skid plate 40 relative to the frame and motor support means 20, the locking screw means 45 will be loosened to permit vertical movement of shank 42 within the housing 43 and locking screw means 52 will be loosened to permit angular adjustment of links 46, 47. After the skid plate has been moved to a selected position, the locking screw means 45 and 52 are then tightened to securely hold the skid plate 40 in a selected adjusted position relative to rotary cutting disc 30.

In order to effectively cut carpet utilizing the rotary cutting disc 30, the cutting apparatus 10 is provided with carpet backing means 60 including a pair of backing plates 61, 62. The backing plates 61, 62 are provided with shaped indentations 63, 64, respectively, and forwardly and rearwardly directed guide arms 63a, 63b, 64a, 64b, respectively. In a carpet cutting operation as shown in FIG. 2, the carpet is supported beneath skid plate 40 with the edge of the carpet turned up and inserted between backing plates 61, 62 and with the rotary cutting disc 30 aligned with the shaped indentations 63, 64. Backing plates 61, 62 are movable between an outwardly displaced inoperable position, as shown in dash lines of FIG. 2, and are adjustable inwardly to a retracted operable cutting position. When backing plates 61, 62 are adjusted to a retracted operable cutting position, the rotary cutting disc 30 will move into shaped recesses 63, 64 and will effectively sever carpet supported therebetween. Backing plates 61, 62 are supported adjacent their upper edges by a pair of arcuate-shaped supporting levers 65, 66, 67 and 68. Backing plate 61 is fixed to intermediate portions of levers 65, 66 and backing plate 62 is fixed to intermediate portions of levers 67, 68. Levers 65, 66 are pivotally attached at 69 to a number of horizontally projecting supporting plates 70. Supporting plates 70 are integrally formed with housing element 43. Levers 67, 68 are pivotally supported on an opposite side of motor housing 21 by being pivotally attached at 71 to a number of plates 72 extending horizontally from housing element 43.

Figures 4, 5:
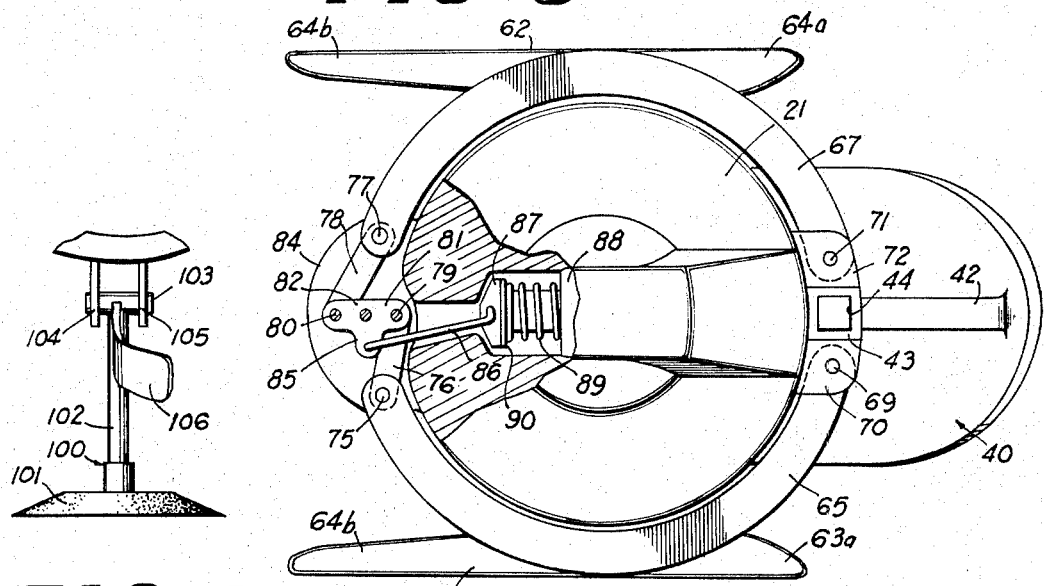
FIG. 4 is a view taken on line 4—4 of FIG. 3.
FIG. 5 is a fragmentary top plan view of FIG. 3, with certain parts broken away and shown in section and certain parts omitted for purpose of clarity.

As shown in FIGS. 3 and 5, opposite ends of levers 65, 66 are pivotally attached at 75 to an actuating link 76. Opposite ends of levers 67, 68 are pivotally attached at 77 to an actuating link 78. Actuator links 76, 78 are pivotally attached at 79, 80, respectively, to a pair of diametrically opposed radially extending actuator arms 81, 82. Actuator arms 81, 82 are fixed to an upstanding actuator shaft 83. Actuator shaft 83 is pivotally supported by a housing structure 84 integrally formed with the motor housing 21. An upper end of actuator shaft 83 is provided with a radially extending actuator arm 85. An extended end of actuator arm 85 is connected by a link 86 to a solenoid plunger 87. Solenoid plunger 87 is supported by a conventional electrically operable solenoid 88 and is spring-biased outwardly by a conventional compression spring 89. Compression spring 89 is secured between solenoid 88 and a retaining clip 90 fixed to the solenoid plunger element 87.

Solenoid 88 and the associated actuator linkage mechanism are supported within the handle attachment housing 23, as shown in FIGS. 3 and 5. Solenoid 88 is connected by a conventional supply line (not shown) to the electrical input line 25 and is moved from an extended inoperable position to a retracted operable position by means of a switch element 95. Solenoid 86 could be wired such that the solenoid would be energized simultaneously with operation of trigger 26 to effect rotary movement of cutting disc 30, and could be conditioned to not operate by moving the switch 95 to an adjusted position or switch 95 could be independently connected to input supply 25.

When solenoid 83 is energized, plunger 87 will be drawn inwardly thereby effecting a counterclockwise movement of actuator arm 85 and actuator shaft 83. A counterclockwise movement of actuator shaft 83 will effect a corresponding counterclockwise movement of actuator arms 81, 82 to thereby pull the support arms 65–68 inwardly, moving backing plates 61, 62 to a retracted operable position, as shown in FIG. 2. When solenoid 88 is de-energized, compression spring 89 will move the actuator assemblies in a clockwise direction thereby displacing backing plates 61, 62 outwardly to the inoperable position to permit a carpet edge to be inserted between the rotary cutting disc and one of the backing plates.

As shown in FIGS. 3 and 4, the cutting apparatus embodying the principles of the present invention is provided with sharpening means 100 operable for selectively sharpening the cutting disc 30. The sharpening means 100 includes a sharpening element 101 attached to an extended end of a support rod 102. Rod 102 is fixed to a support shaft 103 which is pivotally supported by a pair of bracket elements 104, 105. Brackets 104, 105 are integrally formed with motor housing 21. An actuator handle 106 is fixed to support shaft 103 and support rod 102 for effecting angular movement of sharpening tool 101 from a retracted inoperable position to a displaced operable position. The sharpening element 101 is automatically moved to a retracted inoperable position by means of a conventional torsion spring (not shown) supported around shaft 103 and adjacent support brackets 104, 105. Sharpening element 101 is detailed in supported relationship relative to the motor housing 21 and cutter disc 30 such that movement of the sharpening element to an adjusted sharpening position will effectively sharpen the cutting disc 30 to define the desired beveled cutting edge 32.

OPERATION

In utilizing the cutting apparatus embodying the principles of the present invention in trimming carpet edges adjacent a base of an upright wall and a supporting floor, the skid 40 is positioned on the upper surface of carpet to be cut and the edge of the carpet is inserted between the rotary cutting disc 30 and one of the backing plates 61, 62. After the carpet has been positioned between the cutting disc and backing plate, solenoid 88 is energized to move the backing plates to a retracted operable cutting position, as shown in FIG. 2. The edge of the carpet is then trimmed by advancing the cutting apparatus along the floor and against the upright wall. Skid plate 40 is vertically adjusted relative to cutting disc 30 such that the cut carpet edge will extend to a position immediately adjacent the base of the upright wall.

In operation, it would be possible to get the backing plates in a fixed retracted cutting position, with the carpet inserted between the cutting disc 30 and a backing plate 61, 62 by the wedging action formed by an inwardly directed camming surface on backing plate arms 63a, 64a and cutting disc 30.

It now becomes apparent that the above described illustrative embodiment of a carpet cutting apparatus is capable of obtaining the above stated objects and advantages. It is obvious that those skilled in the art may make modifications in the details of construction without departing from the spirit of the invention which is to be limited only by the scope of the appended claims.

What is claimed is:

1. Apparatus for use in cutting carpet comprising, in combination:
   a. frame support means;
   b. power driven cutting means carried by said frame support means;
   c. skid means supported on said frame support means beneath said power driven cutting means, said skid means being adjustably connected to said frame support means whereby the distance between said cutting means and said skid means can be selectively adjusted;
   d. at least one backing plate means carried by said frame support means and operatively associated with said cutting means for providing a backing for carpet being cut, said backing plate means being movably carried by said frame support means; and,
   e. means operatively associated with said backing plate for effecting adjustment of said backing plate between a displaced inoperable position and an adjusted operable position supported adjacent said cutting means.

2. Apparatus for use in cutting carpet comprising, in combination:
   a. frame support means;
   b. power driven cutting means carried by said frame support means;
   c. skid means supported on said frame support means beneath said power driven cutting means, said skid means being adjustably connected to said frame support means whereby the distance between said cutting means and said skid means can be selectively adjusted; and,
   d. at least one backing plate means carried by said frame support means and operatively associated with said cutting means for providing a backing for carpet being cut, said skid means extending beneath said cutting means and being supported adjacent its opposite ends by a pair of support means adjustably connected to said frame support means.

3. Apparatus for use in cutting carpet comprising, in combination:
   a. frame support means;
   b. power driven cutting means carried by said frame support means;
   c. skid means supported on said frame support means beneath said power driven cutting means, said skid means being adjustably connected to said frame support means whereby the distance between said cutting means and said skid means can be selectively adjusted;
   d. at least one backing plate means carried by said frame support means and operatively associated with said cutting means for providing a backing for carpet being cut; and,
   e. said frame support means including a pair of backing plates supported on opposite sides of said cutting means and each of said backing plates being adjustable between a displaced inoperable position and a retracted operable position.

4. An apparatus as in claim 3 further characterized in that said frame support means includes power adjusting means for effecting movement of said backing plates to said retracted operable positions.

5. Apparatus for use in cutting carpet comprising, in combination:
   a. frame support means;
   b. power driven cutting means carried by said frame support means;
   c. skid means supported on said frame support means beneath said power driven cutting means, said skid means being adjustably connected to said frame support means whereby the distance between said cutting means and said skid means can be selectively adjusted;
   d. at least one backing plate means carried by said frame support means and operatively associated with said cutting means for providing a backing for carpet being cut; and
   e. said frame support means including a power driven motor supported in a vertically oriented position and including a downwardly projecting drive shaft, said cutting means including a rotary cutting disc supported on said drive shaft, said skid means including a skid plate extending beneath said rotary cutting disc and including a forward end having an upstanding member adjustably supported by a housing element, the rear end of said skid plate being attached to said frame support by a pair of angularly adjustable link members, said backing plate means including a pair of backing plates supported on said frame support means on diametrically opposed sides of said rotary cutting disc.

6. Apparatus as in claim 1 wherein said frame support means includes a relatively movable sharpening element movable from a retracted inoperable position to an adjusted operable position, said sharpening element being detailed for sharpening said cutting means when moved to said operable position.

* * * * *